Patented Apr. 30, 1935

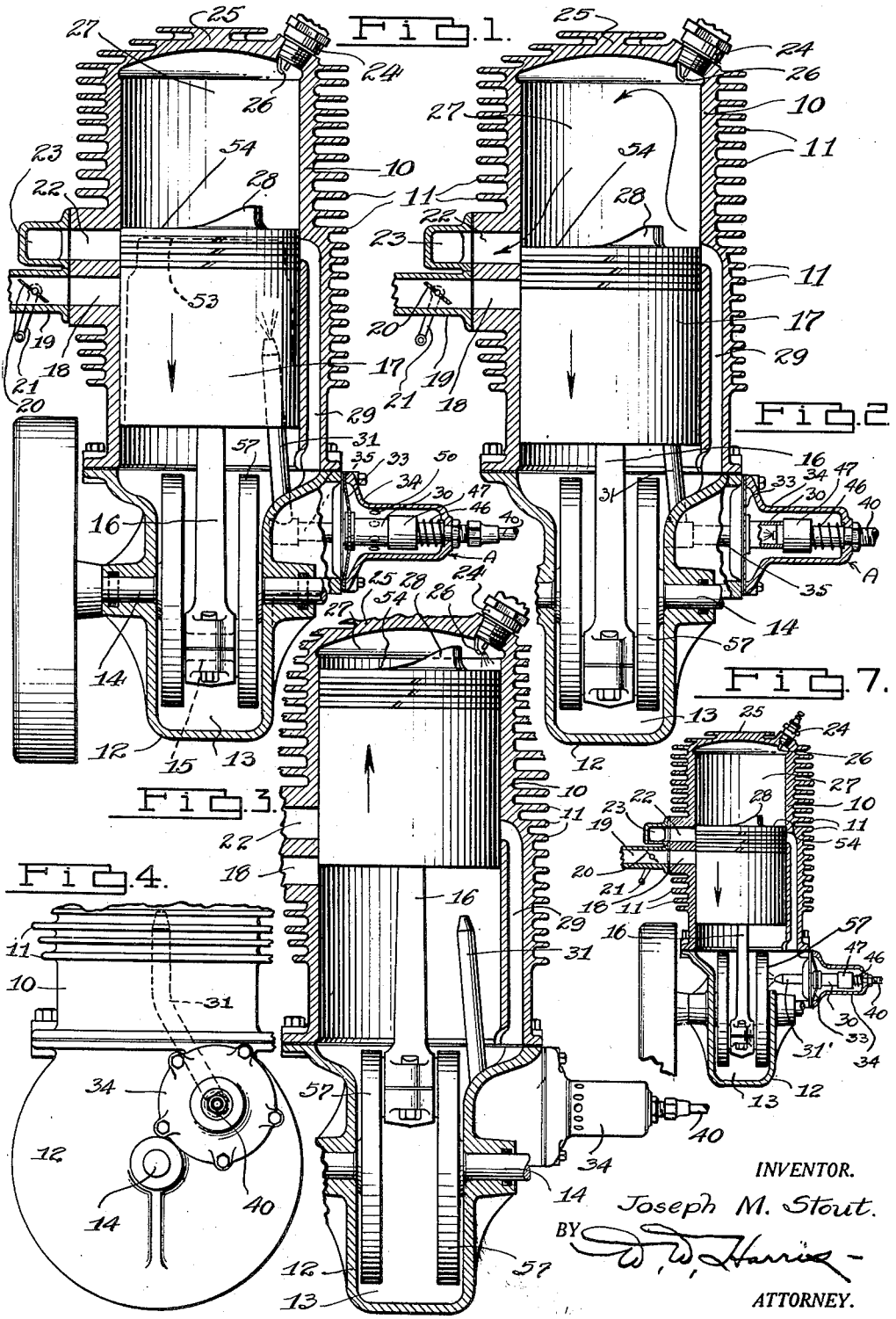

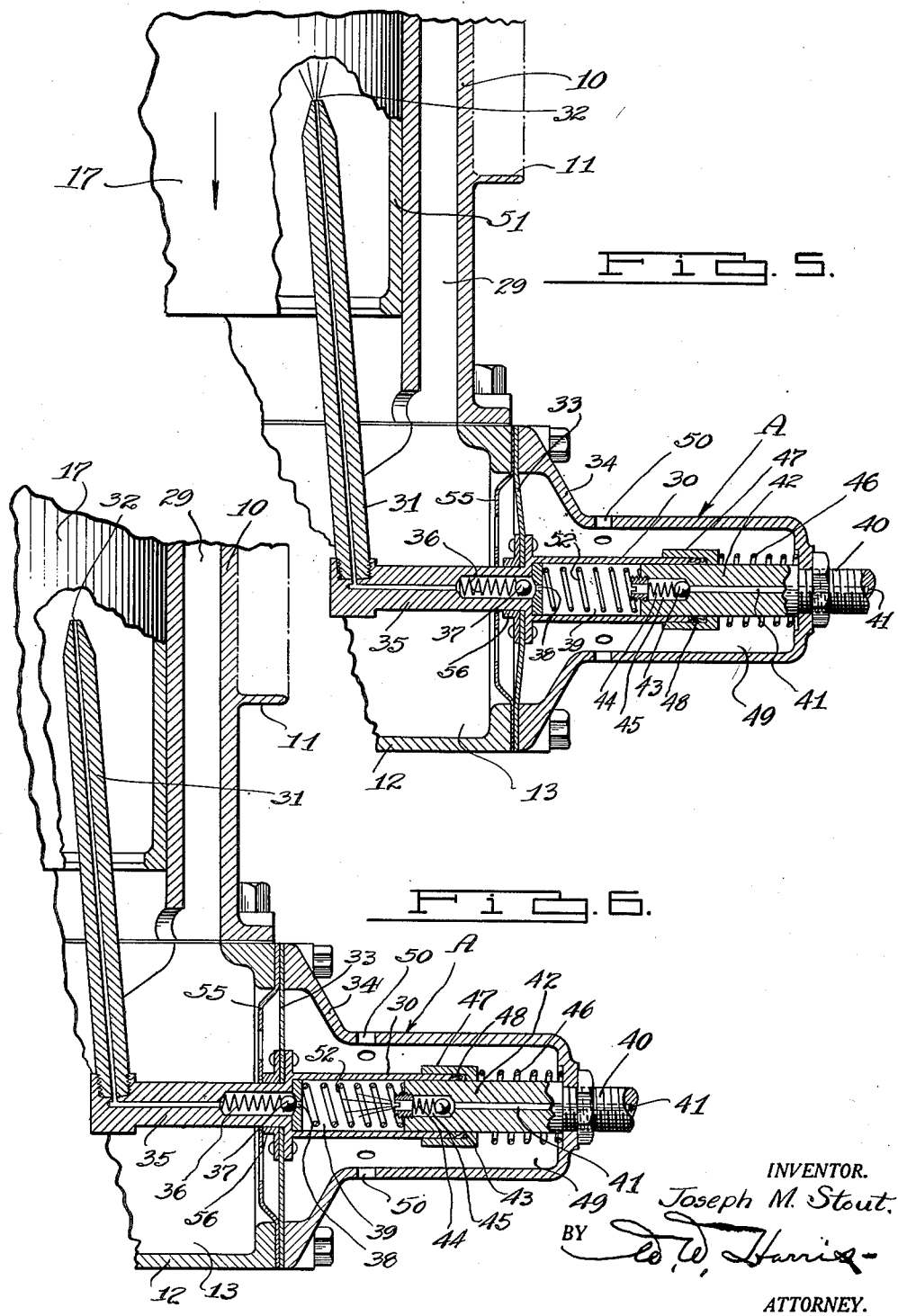

1,999,520

UNITED STATES PATENT OFFICE 1,999,520

ENGINE

Joseph M. Stout, Detroit, Mich., assignor to Continental Motors Corporation, Detroit, Mich., a corporation of Virginia Application May 6, 1931, Serial No. 535,320

21 Claims. (Cl. 123—73)

This invention relates to internal combustion engines and has particular reference to engines of the two stroke cycle type although many of the important features of novelty of our invention may be used equally well with engines operating on other cycles such as the customary four stroke cycle type.

My said invention has among its objects the provision of an engine of the character referred to, which is very efficient in its operation and which may be manufactured at relatively low cost. A further object of my invention resides, in its more specific aspects, in the provision of an engine of the crank case compression type wherein improved engine performance is obtained.

A further object of my invention resides in the provision of a novel fuel feeding and controlling means having an improved efficiency; an engine wherein power output may be controlled by regulating the amount of air introduced to the engine, the amount of fuel injected being automatically responsive to the air throttling or governing mechanism.

Further objects and advantages of my invention will be apparent as this illustrative description progresses, reference being made to the accompanying drawings wherein I have illustrated the salient features of my invention in connection with an engine of the two stroke cycle type, in which:

Figure 1 is a sectional elevation view through the engine with the ports positioned during fuel injection, Figure 2 is a corresponding view showing the ports positioned for fuel mixture transfer from the crankcase to the combustion chamber, Figure 3 is a corresponding view showing the ports positioned for fuel mixture ignition, Figure 4 is a detail elevation view showing the engine crankcase, Figure 5 is an enlarged sectional view of the fuel injection mechanism during injection, Figure 6 is a corresponding view just subsequent to fuel injection, and Figure 7 is a view corresponding to Figure 1 illustrating a modified arrangement of the fuel injection nozzle and associated parts.

Referring to the drawings the engine illustrated is provided with one or more cylinders 10 and for the purpose of illustration the description will be limited to an engine of the single cylinder type, it being understood that any number of cylinders may be incorporated. This cylinder is illustrated for air cooling, cooling fins 11 being provided for this purpose. The engine is provided with a sealed or closed crankcase 12 providing a compression space 13 for the fuel mixture, a crankshaft 14 being mounted in the crankcase and provided with a crank 15 actuated by connecting rod 16 actuated by piston 17.

The cylinder 10 has one or more air intake ports 18 supplied with air by a conduit 19, the quantity of air passing therethrough being regulated by a throttle valve 20 controlled by a lever 21 actuated from any convenient point manually or otherwise. The cylinder is also provided with one or more exhaust ports 22 for conducting engine exhaust gases to the exhaust outlet pipe 23. A spark plug 24 is located in the cylinder head 25, the igniting terminals 26 extending into the combustion chamber 27.

Piston 17 is provided with the customary scavanging baffle 28 adapted to deflect the incoming charge from crankcase 13 to chamber 27 by way of the cylinder transfer passage 29.

Referring to Figures 5 and 6, it will be noted that the crankcase 12 carries a fuel injection apparatus A which comprises a movable cylinder assembly 30 having a fuel injecting nozzle 31 and orifice 32, this structure being mounted on a diaphragm 33 secured between the crankcase and the housing 34 for the apparatus A. Within the nozzle portion 35 is located a spring 36 normally seating a ball valve 37 so as to close the opening 38 between the fuel chamber 39 in the cylinder and nozzle 31. The housing 34 encloses cylinder 30 and supports a fuel intake pipe 40 having a fuel intake passage 41 through which liquid fuel such as gasoline is conducted from a suitable tank (not shown) or other source of supply. The pipe 40 is provided with an inner portion 42 extending within the outer end of cylinder 30 and forming a piston fixed to casing 34 as will be later apparent. The passage 41 within the piston 42 is normally closed by a ball valve 43 urged to its seat by a spring 44 within the enlarged passage 45 which conducts the fuel from passage 41 to cylinder chamber 39. A spring 46 acts against the fixed casing 34 at one end thereof and at its other end acts against a packing member 47 whereby the desired amount of pressure is placed on the packing material 48 so as to prevent escape of fuel from cylinder 30 past piston 42. In order to vent the chamber 49 within casing 34 and to conduct any vaporized fuel which might escape past packing 48, I have provided vent openings 50. It will be noted that nozzle 31 is directed upwardly into the skirt 51 of piston 17 whereby the fuel will be ejected against the relatively hot head of the piston to assist rapid and efficient vaporization of the fuel.

In the operation of the engine with the parts in the position shown in Figure 1, the piston is approaching the end of its power stroke, moving downwardly just prior to uncovering the exhaust port 22 and thereafter passage 29. When the piston moves to the position shown in Figure 2 the passage 29 is just being uncovered to admit fuel mixture into the combustion chamber 27 and the exhaust gases are being simultaneously passed through port 22. As the piston moves upwardly to the position in Figure 3 port 22 and passage 29 are closed, the new charge is compressed and fired near the top dead center position of Figure 3 at which time the suction created in crankcase chamber 13 due to the upward displacement of the piston draws air through port 18 at that time uncovered by the piston skirt 51.

Regarding the fuel injection and control therefor I will assume the charge fired with the position of the ports in Figure 3, the piston then moving downwardly closing air intake port 18 and compressing the air trapped within chamber 13. At a predetermined position in the downward travel of the piston the air pressure will be sufficient to overcome the action of springs 46 and 52 which jointly tend to urge the cylinder assembly 30 away from piston 42 and when this pressure is reached the action of the pressure on diaphragm 33 will cause the diaphragm and cylinder assembly to move from the position illustrated in Figure 2 or Figure 6 to the position illustrated in Figure 1 or Figure 5, thereby forcing the fuel trapped in chamber 39 past the valve 37 which is thereby unseated against its spring 36, the fuel being ejected into the compressed air from nozzle orifice 32 toward and against the under face 53 of the piston head 54. The fuel will thus be ejected until the piston moves sufficiently to uncover passage 29 at which time the pressure in the chamber 13 will be relieved and the fuel mixture therein will pass through passage 29 into the combustion chamber as hereinbefore stated.

When the pressure in the chamber 13 has been thus relieved, the diaphragm 33 and cylinder assembly 30 will be restored to the position in Figure 6 by springs 46 and 52, whereupon spring 36 will seat the ball valve 37 and the suction produced by this movement of cylinder 30 will cause the ball valve 43 to unseat against its spring 44 thus replenishing the fuel in cylinder chamber 39 from the supply line 41.

In order to limit the inward movement of diaphragm 33 I have provided a cage 55 which forms an abutment for the diaphragm flange portion 56.

The force or value of springs 46 and 52 determines the initial load on diaphragm 33 and this load should of course not exceed the pressure reached by the air during the air compression cycle for the position of the throttle valve 20 when the latter is set for the smallest amount of load on the engine. Thus when the engine is idling, the smallest amount of air will be introduced to the chamber 13 and for such condition the pressure developed in the chamber 13 should be sufficient to actuate diaphragm 33 so as to obtain the fuel injection. With such a condition there will be only a relatively small amount of fuel injected since the pressure developed in the crankcase chamber will occur at a relatively late period in the downward movement of this piston. This provides automatic regulation of the quantity of fuel injected in proportion to the setting of the air intake throttle valve 20. Thus when the throttle valve 20 is set for the introduction of a larger quantity of air to the chamber 13, it will be apparent that the air pressure necessary to actuate the diaphragm 33 will be developed at an earlier period in the cycle of downward movement of the piston whereby a correspondingly greater amount of fuel will be injected into chamber 13.

Referring to Figure 7 I have disclosed a modified position for the injector nozzle 31' which is directed toward the disc face 57 of the crankshaft 14. All other parts are as previously described and the operation is the same except that the fuel is injected toward face 57 instead of toward the piston face. In Figure 7 the action of disc face 57 rotating will whirl or throw off the fuel into chamber 13 providing for good fuel distribution into the surrounding air.

The engine may be lubricated by the introduction of lubricating oil into the fuel at its source of supply or any separate oiling system may be provided as desired.

While I have shown and described my invention in detail for purposes of illustration I desire it understood that I do not limit my invention to the specific arrangement or construction shown, as various modifications will be apparent within the scope of my invention as defined in the appended claims.

What I claim as my invention is:

1. In an internal combustion engine having a cylinder with associated piston and closed crankcase, air supply means for the crankcase, fuel injection means for the crankcase, and means responsive to compression of the air within the crankcase for causing operation of said fuel injection means.

2. In an internal combustion engine having a cylinder with associated piston and closed crankcase, air supply means for the crankcase, fuel injection means for the crankcase, and means responsive to compression of the air within the crankcase for causing operation of said fuel injection means, and a sparking device for firing the fuel and air mixture in the cylinder.

3. In an internal combustion engine having a cylinder with associated piston and closed crankcase, air supply means for the crankcase, fuel injection means for the crankcase, and means responsive to compression of the air within the crankcase for causing operation of said fuel injection means, and a passage controlled by movement of the piston for passing the fuel mixture to the cylinder.

4. In an engine having a closed fuel and air mixing chamber, a cylinder having an air intake port and an exhaust port, a piston controlling said ports, a passage between said mixing chamber and said cylinder also controlled by the piston, fuel supply means for said chamber responsive in its operation to air pressure developed in said chamber by said piston.

5. In an internal combustion engine having a crankcase, a cylinder and piston associated therewith, said cylinder providing a combustion chamber, means introducing air to said engine crankcase, and means injecting fuel to said engine against a relatively hot surface thereof, said surface being separated from the combustion chamber and open to the crankcase.

6. In an internal combustion engine having a crankcase, a cylinder and piston associated therewith, said cylinder providing a combustion chamber, means introducing air to said engine crankcase, and means injecting fuel to said engine against the under face of said piston for mixture with the air in the crankcase.

7. In an internal combustion engine having a cylinder providing a combustion chamber, a crankcase providing a fuel and air compressing chamber, a piston separating said chambers, means introducing air to said crankcase and means for supplying fuel to said crankcase, said last mentioned means adapted to direct the fuel against a surface of the piston head face bounding said compressing chamber, and means for passing the compressed fuel and air mixture to the combustion chamber.

8. In an internal combustion engine having a cylinder providing a combustion chamber, a crankcase providing a fuel and air compressing chamber, a piston separating said chambers, means introducing air to said crankcase, and means for supplying fuel to said compressing chamber, said means adapted to direct the fuel within the piston, and means passing the compressed fuel and air mixture to the combustion chamber.

9. In an internal combustion engine having a cylinder providing a combustion chamber, a closed fuel and air mixing chamber separate from the combustion chamber, said cylinder having an air inlet port and an exhaust port, said piston controlling passage of air from said air inlet port to said mixing chamber, means responsive to air pressure in the mixing chamber for injecting fuel into said chamber, and means passing the fuel mixture from said mixing chamber to said combustion chamber.

10. In an internal combustion engine having a cylinder providing a combustion chamber, a fuel and air mixing chamber separate from the combustion chamber, said cylinder having an air inlet port and an exhaust port, said piston controlling passage of air from said air inlet port to said mixing chamber, means responsive to air pressure in the mixing chamber for injecting fuel into said chamber within said piston, and means passing the fuel mixture from said mixing chamber to said combustion chamber.

11. In an internal combustion engine having a cylinder providing a combustion chamber, a fuel and air mixing chamber separate from the combustion chamber, said cylinder having an air inlet port and an exhaust port, said piston controlling passage of air from said air inlet port to said mixing chamber, means responsive to air pressure in the mixing chamber for injecting fuel into said chamber against the piston face bounding said mixing chamber, and means passing the fuel mixture from said mixing chamber to said combustion chamber.

12. In an internal combustion engine having a piston and cylinder and a crankcase, a rotor in said crankcase, air supply means for the crankcase, means injecting fuel into the crankcase against said rotor, and means for passing the fuel mixture from the crankcase to the cylinder.

13. In an internal combustion engine having a piston and cylinder and a crankcase, a crankshaft within said crankcase connected to said piston, air supply means for the crankcase, means injecting fuel into said crankcase to impinge against the crankshaft so as to be distributed by said crankshaft in the crankcase, and means passing the fuel mixture from the crankcase to the cylinder.

14. In an internal combustion engine, a cylinder, a piston operable within the cylinder, a crankcase having an opening, a flexible wall closing said crankcase opening and adapted to be flexed in response to compression pressure within the crankcase, and a fuel injection device carried by said flexible wall.

15. In an internal combustion engine, a cylinder, a piston operable within the cylinder, a crankcase having an opening, a flexible wall closing said crankcase opening and adapted to be flexed in response to compression pressure within the crankcase, and a fuel injection device associated with said flexible wall and actuated in response to flexing of same to inject fuel into the engine crankcase.

16. In an internal combustion engine having a cylinder, a piston and a crankcase providing a closed fuel and air mixing chamber, means controlled by the piston for controlling the introduction of air into the crankcase, and fuel injection means for introducing fuel into the crankcase for mixture with the air previously introduced therein.

17. In an internal combustion engine having a cylinder, a piston and a crankcase providing a closed fuel and air mixing chamber, means controlled by the piston for controlling the introduction of air into the crankcase, fuel injection means for introducing fuel into the crankcase for mixture with the air in said crankcase, and means acting on the fuel for directing same against a fuel distributing surface to facilitate the mixing of the fuel with the air in said crankcase.

18. In an internal combustion engine having a cylinder, a piston and a crankcase providing a closed fuel and air mixing chamber, means controlled by the piston for controlling the introduction of air into the crankcase, fuel injection means for introducing fuel into the crankcase for mixture with the air in said crankcase, and means acting on the fuel for directing same against the underside of the piston to facilitate the mixing of the fuel with the air in said crankcase.

19. In an internal combustion engine having a cylinder, a piston and a crankcase providing a closed fuel and air mixing chamber, means controlled by the piston for controlling the introduction of air into the crankcase, and fuel injection means including an orifice opening into the crankcase for introducing fuel into the crankcase for mixture with the air therein.

20. In an internal combustion engine having a cylinder, a piston and a crankcase providing a closed fuel and air mixing chamber, means controlled by the piston for controlling the introduction of air into the crankcase, fuel injection means for introducing fuel into the crankcase for mixture with the air therein, and regulable means associated with said air intake means.

21. In an internal combustion engine having a cylinder, a piston and a crankcase providing a closed fuel and air mixing chamber, means controlled by the piston for controlling the introduction of air into the crankcase, fuel injection means for introducing fuel into the crankcase for mixture with the air therein, regulable means associated with said air intake means whereby to control the air pressure produced in said crankcase, and means responsive to compression of the air within the crankcase for causing operation of said fuel injection means.

JOSEPH M. STOUT.